JOHN J. KIMBALL, OF NAPIERVILLE, ILLINOIS.

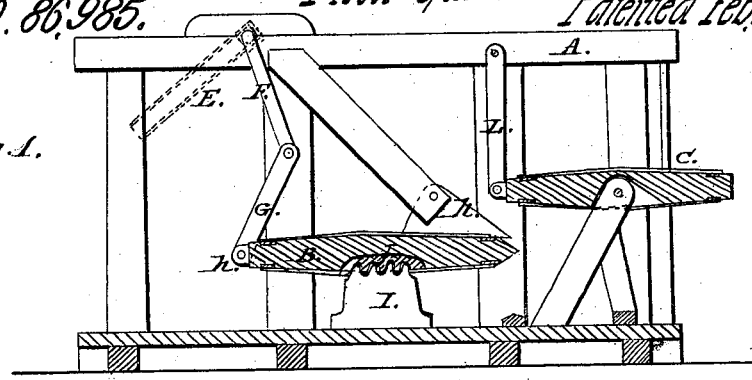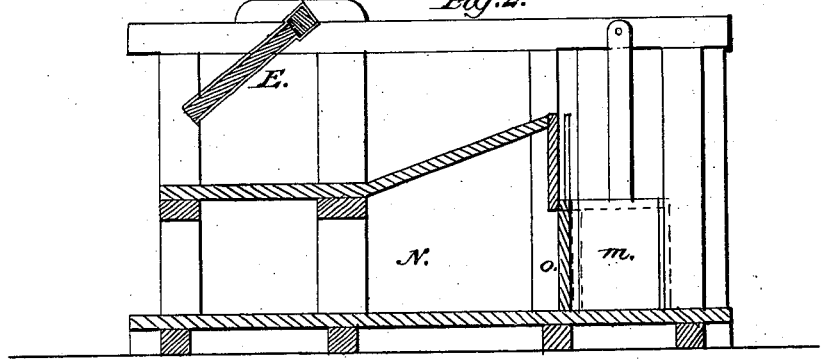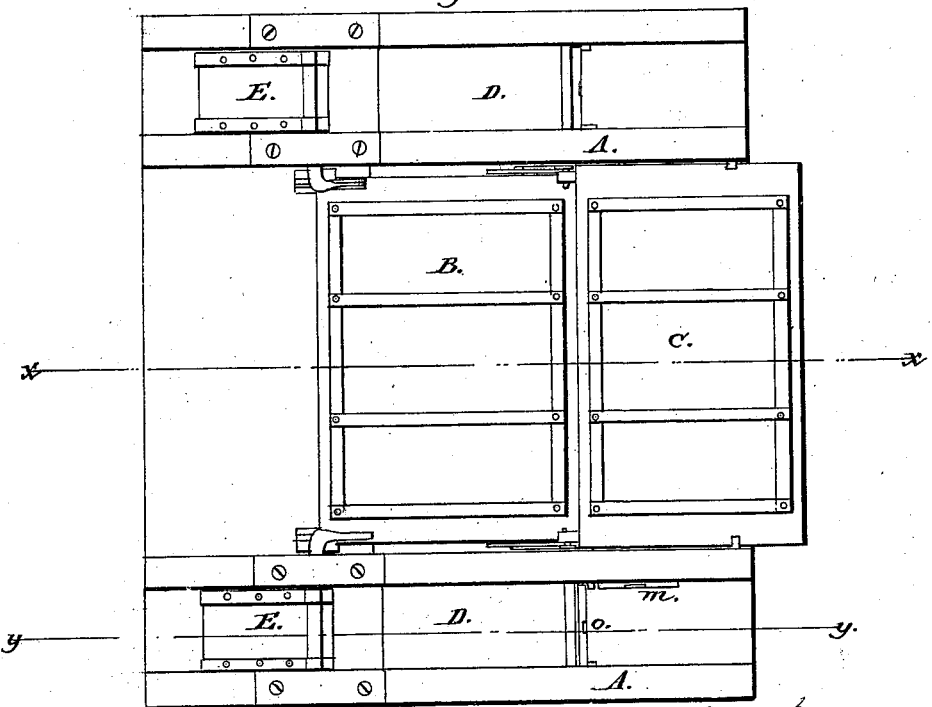

Letters Patent No. 86,985, dated February 16, 1869.

IMPROVED FLOOD-GATE.

The Schedule referred to in these Letters Patent and making part of the same.

*To all whom it may concern:*

Be it known that I, JOHN J. KIMBALL, of Napierville, in the county of Du Page, and State of Illinois, have invented a new and useful Improvement in Flood-Gates; and I do hereby declare that the following is a full, clear, and exact description thereof, which will enable those skilled in the art to make and use the same, reference being had to the accompanying drawings, forming part of this specification.

This invention relates to a new and useful improvement in gates for controlling the flow of water; and It consists in the construction and arrangement of a gate, which is moved automatically in a properly-constructed frame, whereby the surplus or overflow-water is allowed to escape without flooding adjacent lands, the same being arranged and operated as hereinafter more fully described.

Figure 1 is a vertical longitudinal section of the arrangement through the line $x\ x$ of fig. 3;

Figure 2 is a vertical section through the line $y\ y$ of fig. 3; and

Figure 3 is a plan view.

Similar letters of reference indicate corresponding parts.

A represents the frame, which forms the sluice or gateway in which the gate operates.

This frame is made of timbers, of suitable size and strength, with the requisite planking attached thereto.

B is the automatic gate, by which the flow of water is regulated.

C represents a head-gate, to be used in case of repairs or obstruction.

D D represent a penstock within the frame A, on each side of the gate, through which the water passes, and operates on floats E E in such a manner as to impart motion to the gate B.

These floats swing from shafts, which have their bearings on the top of the frame.

To the inner ends of the shafts, cranks, F, are attached, which are connected with the gate by the rods G.

These rods are pivoted to the edge of the gate, as seen at $h$.

The connection of the rod with the crank is a joint, so that they form an elbow, and allow the edge of the gate to be raised or lowered, according to the force or pressure of the water.

The gate turns on journals, which, in this example of my invention, are placed about one-third the width of the gate from its lower edge, for the purpose of being more easily operated; but I do not confine myself to that particular method, as the position of the journals may be varied in any manner deemed most advisable under the circumstances.

The middle of the gate rests on a support marked I, which is provided with one or more cogs, which engage with cogs on a plate attached to the gate, so that when the gate raises or lowers, it will be kept in place.

This cogged plate on the gate is marked J in the drawing, as seen in fig. 1.

When the gate is open, as represented in the drawing, it bears against the stop-plates K, which are bolted or fastened to the sides of the sluice-way.

The ends of the gate are supported on projecting plates when it is open, which supports (in connection with the middle support I) enable the gate to sustain the weight of water, without becoming displaced, and without interfering in any manner with its movement in closing or opening.

The head-gate C is arranged so as to stop the flow of water (when it is desired to do so) for making repairs or for removing obstructions.

It is hung on central bearings or pivots, and supported about midway from the bottom of the sluice, as seen in the drawing.

It is secured in a horizontal position (or open) by the rods L.

The pressure of the water being so much greater on its lower part, it will of course close without difficulty.

For assisting in opening it, when occasion may require, I provide a slide-gate, $m_1$ by raising which, the space between the two gates becomes filled with water, and an equilibrium of pressure produced, which allows the gate to be opened without difficulty.

Beneath the penstocks D D there are sluice-ways N, provided with sliding gates O, for the discharge of surplus water in case of obstruction or repairs.

The gates are made of wood, securely bound with iron, and otherwise constructed so as to insure their durability and proper operation.

I claim as new, and desire to secure by Letters Patent—

1. In combination with a flood-gate way, the penstocks D D, with the sluices and gates beneath, arranged substantially as and for the purposes described.

2. The combination of the gate B, cogged support and plate I J, rods G, cranks F, and floats E, with the main sluice and the penstocks D, substantially as described, for the purpose specified.

3. The arrangement of the slide-gate $m$, with reference to the gate C and penstock D, as herein described, for the purpose specified.

JOHN J. KIMBALL.

Witnesses:
L. G. KENT,
O. W. STUTENROTH.